US012641515B2

(12) United States Patent
Soryal et al.

(10) Patent No.: US 12,641,515 B2
(45) Date of Patent: May 26, 2026

(54) METHOD AND SYSTEM FOR ASSISTING WIRELESS ACCESS POINTS WITH SATELLITE CONTROL PLANE

(71) Applicant: AT&T Intellectual Property I, L.P., Atlanta, GA (US)

(72) Inventors: Joseph Soryal, Glendale, NY (US); Howard Lang, Wayside, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 648 days.

(21) Appl. No.: 18/066,544

(22) Filed: Dec. 15, 2022

(65) Prior Publication Data

US 2024/0129831 A1 Apr. 18, 2024

Related U.S. Application Data

(60) Provisional application No. 63/417,046, filed on Oct. 18, 2022.

(51) Int. Cl.
| | |
|---|---|
| *H04W 40/16* | (2009.01) |
| *H04B 7/185* | (2006.01) |
| *H04W 28/086* | (2023.01) |
| *H04W 40/20* | (2009.01) |

(52) U.S. Cl.
CPC ........ *H04W 40/16* (2013.01); *H04B 7/18519* (2013.01); *H04W 28/086* (2023.05); *H04W 40/20* (2013.01)

(58) Field of Classification Search
CPC ... H04W 40/16; H04W 28/086; H04W 40/20; H04B 7/18519
See application file for complete search history.

(56) References Cited

U.S. PATENT DOCUMENTS

| | | | | |
|---|---|---|---|---|
| 10,516,999 B1 * | 12/2019 | Desai | ..................... | H04W 16/28 |
| 2004/0058682 A1 * | 3/2004 | Kitchin | ................. | H04W 76/23 |
| | | | | 455/445 |
| 2007/0109972 A1 * | 5/2007 | MacDonald | .......... | H04W 84/18 |
| | | | | 370/252 |
| 2009/0232026 A1 * | 9/2009 | Lu | ......................... | H04W 40/12 |
| | | | | 370/254 |
| 2017/0111810 A1 * | 4/2017 | Awada | ................... | H04B 17/26 |
| 2019/0082375 A1 * | 3/2019 | Ise | ......................... | H04W 16/28 |
| 2019/0281473 A1 * | 9/2019 | Liao | ...................... | H04W 24/02 |
| 2019/0373574 A1 * | 12/2019 | Anami | ................... | H04M 1/00 |

* cited by examiner

*Primary Examiner* — Phirin Sam
*Assistant Examiner* — Tarell A Hampton
(74) *Attorney, Agent, or Firm* — Guntin & Gust, PLC; Colin LaRose

(57) ABSTRACT

Aspects of the subject disclosure may include, for example, obtaining an image of a location that includes a wireless access point; analyzing the image to determine a potential signal interference from an object that has moved into a position with respect to the wireless access point; and generating routing instructions for wireless communications according to the potential signal interference. Other embodiments are disclosed.

17 Claims, 7 Drawing Sheets

230

CAPTURE IMAGE — 2300

IMAGE PATTERN RECOGNITION — 2310

DETERMINE POTENTIAL INTERFERENCE — 2320

GENERATE ROUTING INSTRUCTIONS — 2330

230

300

600

METHOD AND SYSTEM FOR ASSISTING WIRELESS ACCESS POINTS WITH SATELLITE CONTROL PLANE

CROSS REFERENCE TO RELATED APPLICATIONS

This application claims priority to U.S. Provisional Patent Application Ser. No. 63/417,046 filed on Oct. 18, 2022. All sections of the aforementioned application are incorporated herein by reference in their entirety.

FIELD OF THE DISCLOSURE

The subject disclosure relates to a method and system for assisting wireless access points with satellite control plane.

BACKGROUND

Wireless access points are commonly used to support wireless communication systems. Distributed wireless networks, such as where individual users buy wireless access points (e.g., hotspots) to be used by strangers, are becoming a common model.

BRIEF DESCRIPTION OF THE DRAWINGS

Reference will now be made to the accompanying drawings, which are not necessarily drawn to scale, and wherein.

DETAILED DESCRIPTION

The subject disclosure describes, among other things, illustrative embodiments for obtaining images of locations that include wireless access points; analyzing the images to determine potential signal interference from an object(s) or other event that has moved into a position with respect to the wireless access point; and generating routing instructions for wireless communications according to the potential signal interference. The methods and systems described herein can implement a satellite control plane (in whole or in part) which can operate all the time or some of the time. Other embodiments are described in the subject disclosure.

One or more aspects of the subject disclosure include a non-transitory machine-readable medium, comprising executable instructions that, when executed by a processing system including a processor of a satellite, facilitate performance of operations, the operations comprising: obtaining an image of a location that includes a wireless access point; analyzing the image to determine a potential signal interference from an object that has moved into a position with respect to the wireless access point; and generating routing instructions for wireless communications according to the potential signal interference.

One or more aspects of the subject disclosure include a wireless access point, comprising: a processing system including a processor; and a memory that stores executable instructions that, when executed by the processing system, facilitate performance of operations, the operations comprising: receiving routing instructions that are generated according to analyzing of an image captured by a satellite to determine a potential signal interference for one or more recipient wireless access points; and transmitting wireless communications according to the routing instructions thereby avoiding the potential signal interference.

One or more aspects of the subject disclosure include a method, comprising: capturing, by a processing system including a processor of a satellite, an image; obtaining, by the processing system, routing instructions that are generated according to analyzing of the image captured by the satellite to determine a potential signal interference for one or more recipient wireless access points; and providing, by the processing system, the routing instructions to one of a source wireless access point or an end user device for transmitting wireless communications according to the routing instructions thereby avoiding the potential signal interference.

Figure 1:
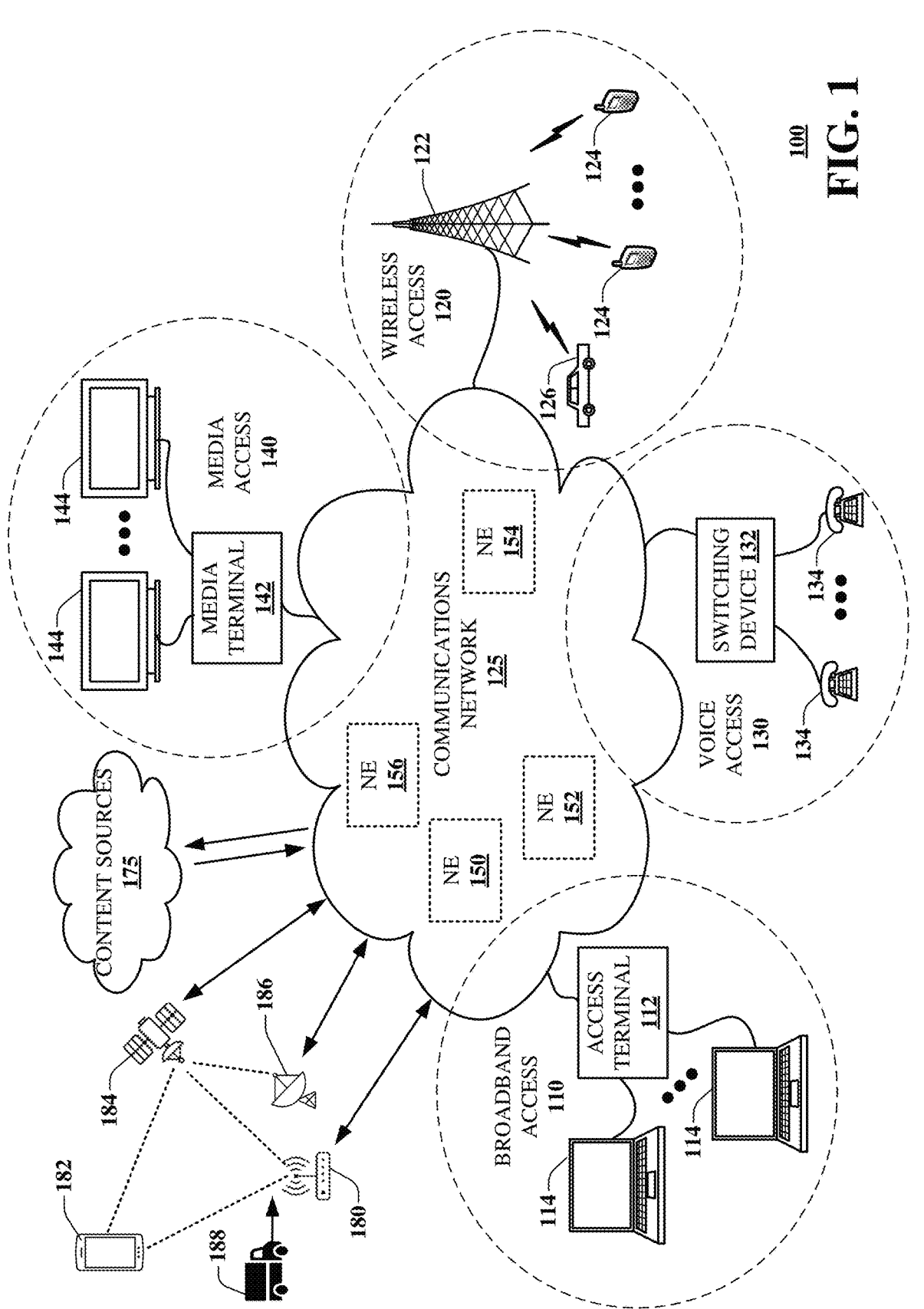
FIG. 1 is a block diagram illustrating an exemplary, non-limiting embodiment of a communications network in accordance with various aspects described herein.

Referring now to FIG. 1, a block diagram is shown illustrating an example, non-limiting embodiment of a system 100 in accordance with various aspects described herein. System 100 can include satellites 184 (only one of which is shown) that communicate with terrestrial equipment 186 (only one of which is shown) that communicate with the network core such as of network 125. System 100 facilitates determining or predicting interference or other network parameters or events that could effect communication services being provided to end user devices 182 (only one of which is shown). As an example, the end user device 182 may seek services through use of wireless access points 180 (only one of which is shown). A truck 188 may be moving into the area or may already be in the area, which can cause interference (e.g., parked in front of the coffee shop where the wireless access point 180 is located). Images captured by the satellite 184 can detect the truck and image pattern recognition can be utilized to determine potential interference. This information can be used for generating routing instructions.

Artificial Intelligence/Machine Learning (AI/ML) can be utilized to facilitate the analysis including making predictions as to locations, directionality, times, durations and/or amount of interference. These functions can be performed at the satellite 184 and/or elsewhere such as in the network core, at the equipment 186 and so forth. The routing instructions can be provided to the appropriate device, such as the end user device, the source wireless access point device, and so forth so that routing can be done to avoid the interference, such as selecting a different wireless access point that does not have the interference.

For example, system 100 can facilitate in whole or in part obtaining an image of a location that includes a wireless access point; analyzing the image to determine a potential signal interference from an object that has moved into a position with respect to the wireless access point; and generating routing instructions for wireless communications according to the potential signal interference.

In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
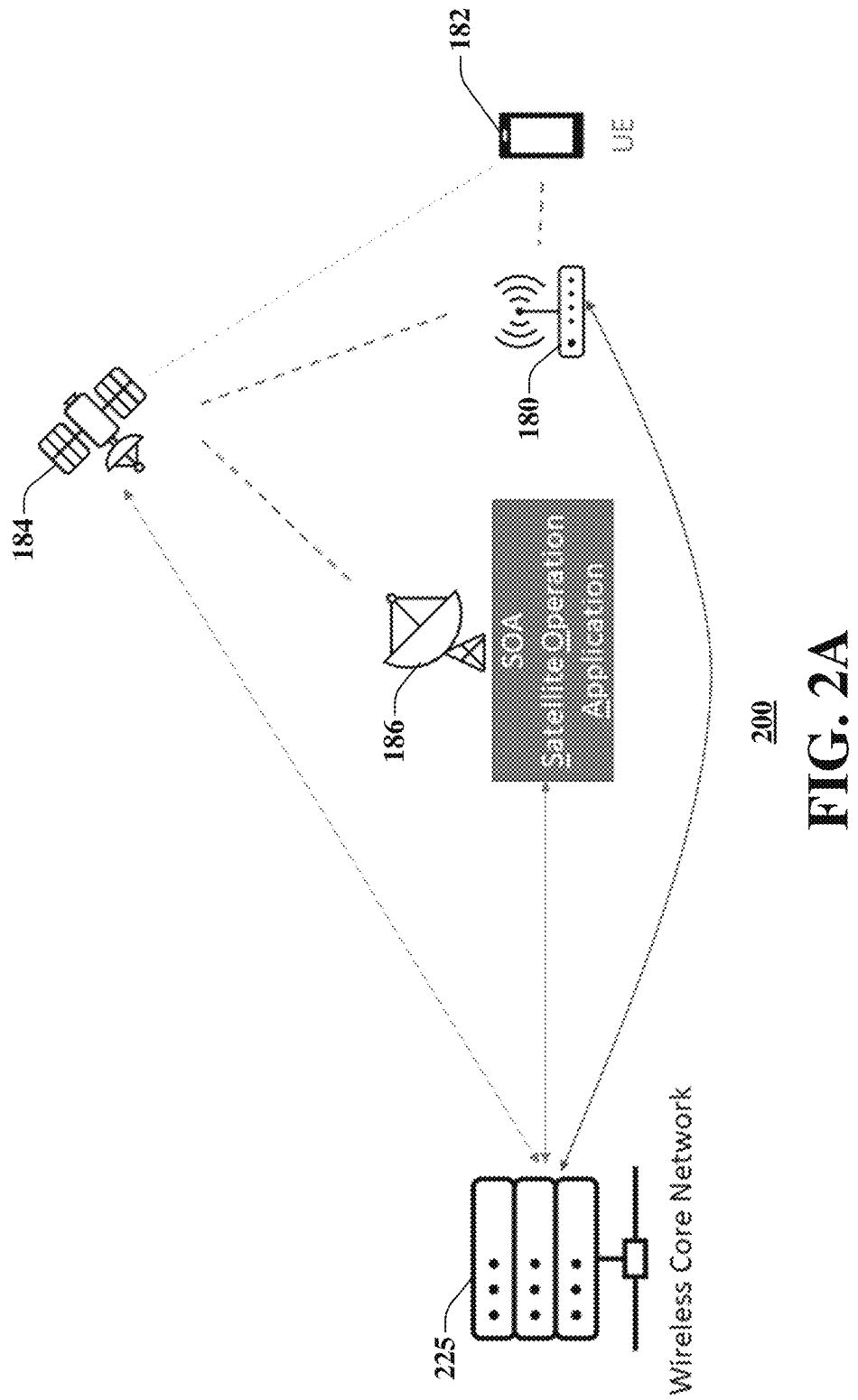
FIG. 2A is a block diagram illustrating an example, non-limiting embodiment of a system functioning within the communication network of FIG. 1 in accordance with various aspects described herein.

FIG. 2A is a block diagram illustrating an example, non-limiting embodiment of a system functioning within the communication network of FIG. 1 in accordance with various aspects described herein. In one or more embodiments, system 200 can facilitate management or support for distributed wireless networks including where individual users buy wireless access points to be used by strangers. In one or more embodiments, to provide an improved, faster, and more efficient control of these distributed wireless nodes, the overall management plane of system 200 can use a satellite network for faster routing such as based on active nodes, more secure links, cheaper techniques, and so forth. In one or more embodiments, satellites can be used to perform technical administrative functions such as proof of location, accurate geolocation and changes, and so forth. In one or more embodiments, an API layer can be created at the satellite systems for individual queries such as occasional location verification, consulting for best routes, most available routes, and so forth.

In one or more embodiments, a satellite communications interface chip can be embedded in the individual wireless access points or gateways. In one or more embodiments, wireless access points that do not have satellite chips or capabilities can seek out and interface with other wireless access points or other equipment that does have the satellite interface.

In one or more embodiments, a software package can be embedded or otherwise installed inside the wireless gateway that communicates with a Satellite Operation Application (SOA). In one or more embodiments, a software package can be provisioned to the wireless gateway via Over-The-Air (OTA) provisioning or other means such as a plug-and-install interface. In one or more embodiments, the SOA can be located on various equipment such as the satellite, the terrestrial equipment, edge servers, core network equipment and/or other network elements. In one or more embodiments, the SOA can maintain a profile of each wireless gateway (or groups of gateways) that can be updated, such as by the Wireless Core Network (WCN) 225. In one or more embodiments, the WCN can know or detect (e.g., via query, location detection techniques and so forth) a precise location of each wireless access point. In one or more embodiments, the wireless access points 180 can be fixed and/or mobile.

In one or more embodiments, routing between neighboring wireless access points can use information provided by the satellites 184 such as the physical location and physical barriers via processing images with the satellites. In one or more embodiments, the satellites 184 can facilitate routing during dynamic situations where obstacles such as moving cars/trucks would come nearby the wireless access point to block the signal.

In one or more embodiments, satellites 184 can facilitate routing during dynamic situations where many users, such as groups of people coming out of a stadium, would come nearby the wireless access point to overload a wireless access point.

In one or more embodiments, satellites 184 (or other devices of system 200) can perform image processing and review historical records in terms of what types of obstacles and numbers of users that can adversely impact the signal, and can provide an alternate route or access point to potential users to attach to. In one or more embodiments, AI/ML can enhance the decision-making for routing including making predictions as to future events, future interference, future services to be implemented, future performance parameters, and so forth. In one or more embodiments, satellites 184 can distribute routing instructions or recommendations to various devices including directly to end user devices 182 and/or to the wireless access points 180.

In one or more embodiments, based on the circumstances in the area, the satellites 184 can provide load balancing for the wireless access point as well as other wireless access points.

In one or more embodiments, system 200 can provide or otherwise facilitate secure temporal routing. In one or more embodiments, satellites 184 can provide temporary access codes to end user devices for a particular wireless access point(s), then the satellite can select or recommend the next hop for the traffic in real-time or a very short time period.

In one or more embodiments, the satellite 184 can, in real-time, direct the traffic by connecting to the wireless access point 180 and commanding it to transmit traffic to a particular destination via a selected route and then within a particular time period (e.g., several minutes), the satellite can change the route so it is difficult to track by external entities performing traffic monitoring. In one or more embodiments, the satellite can have two or more paths for the same traffic stream. In one or more embodiments, the satellite 184 can work with or otherwise coordinate with a terrestrial routing control (e.g., terrestrial equipment 186, an edge server, core network 225, and so forth) such that the satellite takes over routing control after a trigger or event is detected, such as a performance parameter no longer satisfying a threshold. Other types of triggers for enabling the satellite control plane to be employed can include security concerns for a highly-confidential communication, banking information, crypto-currency exchange, and so forth.

In one embodiment, satellite 184 can obtain an image of a location that includes a wireless access point 180; analyze the image to determine a potential signal interference from an object that has moved into a position with respect to the wireless access point; and generate routing instructions for wireless communications according to the potential signal interference. In one embodiment, satellite 184 can provide the routing instructions to a source wireless access point that enables the source wireless access point to transmit the wireless communications to a recipient wireless access point so as to avoid routing to the wireless access point.

In one embodiment, satellite 184 can select the recipient wireless access point from among a group of wireless access points based in part on load balancing (e.g., loads determined for other wireless access points or other equipment of the network). In one embodiment, satellite 184 can communicate with various devices, including end user device 182, wireless access point 180, recipient access point (not shown), terrestrial equipment 186 (which may be operating a satellite operation application) and/or wireless network core 225. In one embodiment, satellite 184 can select a second recipient wireless access point based on avoiding routing to the wireless access point 180 and based on avoiding routing to the recipient wireless access point; generating second routing instructions for second wireless communications associated with end user device 182 according to the selecting of the second recipient wireless access point; and providing the second routing instructions to one of the source wireless access point or the end user device. In one embodiment, satellite 184 can provide the routing instructions to end user device 182 that enables the end user device to transmit the wireless communications to a recipient wireless access point so as to avoid routing to the wireless access point 180. In one embodiment, satellite 184 can select the recipient wireless access point from among a group of wireless access points based in part on load balancing. In one embodiment, satellite 184 can provide routing instructions to a source wireless access point, where the source wireless access point rejects the routing instructions and transmits the wireless communications to the wireless access point 180.

In one embodiment, satellite 184 can obtain a second image of the location that includes the wireless access point 180; analyze the second image to determine that the potential signal interference no longer exists; and generate second routing instructions for second wireless communications according to the potential signal interference no longer existing.

In one embodiment, satellite 184 can provide the routing instructions to a source wireless access point that enables the source wireless access point to transmit the second wireless communications to the wireless access point. In one embodiment, satellite 184 can provide the routing instructions to an end user device that enables the end user device to transmit the second wireless communications to the wireless access point. In one embodiment, the object can be one of a vehicle or a group of people. In one embodiment, the analyzing the image to determine the potential signal interference from the object comprises machine learning utilizing a model that is trained on objects that include at least one of the vehicle or the group of people, where the model generates a prediction that quantifies the potential signal interference.

In one embodiment, wireless access point 180 can receive routing instructions that are generated according to analyzing of an image captured by a satellite to determine a potential signal interference for one or more recipient wireless access points (not shown); and transmitting wireless communications according to the routing instructions thereby avoiding the potential signal interference. In one embodiment, the routing instructions are received from one of the satellite, a terrestrial network element, or an end user device sourcing the wireless communications.

In one embodiment, the potential signal interference is one of a vehicle or a group of people that appears in the image. In one embodiment, the analyzing the image comprises machine learning utilizing a model that is trained on objects that include at least one of the vehicle or the group of people, where the model generates a prediction as to an effect (e.g., quantified) of the potential signal interference on the wireless communications.

In one embodiment, the routing instructions are received from one of the satellite or a terrestrial network element executing a satellite operation application that has access to a topology profile comprising locations of a plurality of wireless access points that includes the wireless access point and the one or more recipient wireless access points, where the topology profile is periodically updated by equipment of a wireless core network.

System 200 can detect or predict interference or events that effect service of end user devices, such as interferors (including trucks, other movable objects, fixed objects, large number of end users devices, etc.) located near end user devices, near source wireless access points, near recipient wireless access points, and/or any location that effects signal transmitting and receiving. System 200 can perform various functions described herein at various devices (or combinations of devices) such as the satellites, the terrestrial equipment, the wireless core network, the end user devices, and so forth.

In one embodiment, the wireless access points can be associated with car services such as Uber or Lyft. In one embodiment, system 200 can provide independent hotspots (e.g., owned by third parties) with an efficient routing model, security and improved quality of service. In one embodiment, the satellites 184 can be utilized for particular or selected control plane functionalities such as routing.

In one embodiment, system 200 implements an API for the satellite systems so that specific queries can be made, including location, RF parameters, number of attached devices, and so forth. In one embodiment, the wireless access point profiles, which can be stored by or accessible to the satellites, can have information about each wireless access point or gateway which will be updated periodically, such as by the core network. In one embodiment, the profiles include a precise location of each wireless access point, and the capacity utilization of each.

In one embodiment, an end user device, such as a mobile phone or vehicle communication system can be the wireless access point and system 200 can monitor its location, as well as detecting or predicting interferors near the mobile wireless access point.

In one embodiment, system 200 can switch (based on image analysis, ML/AI, location services, and so forth) between mobile phones operating as wireless hotspots such as where the first mobile phone is moved into a basement location while the second mobile phone moves to the top of a building.

In one embodiment, the satellites can proactively perform routing determination described herein. In one embodiment, the satellites can intelligently select wireless access points to prevent overload to a given access point. For example, the satellites can use image processing and also use historical information. As another example, system 200 can analyze the last several times where a sporting event took place at a stadium and look at capacity utilization during that event to predict the effect of the upcoming sporting event on wireless access points near the stadium. In one embodiment, system 200 can determine where users are sitting, what the capacity utilization at that time of day was, and predict where alternate routes need to proactively be considered.

In one embodiment, system 200 can employ a combination of feeding information to the end user devices and feeding information to the access point. For instance, a profile can be provided for or to an end user device which indicates that at the current location it would be better to use a particular carrier's wireless spectrum or it would be better to use CBRS, which can also be determined according to capacity utilization which has been predicted for the end user device and for other devices in that particular area.

In one embodiment, the wireless access point can operate utilizing CBRS where there are multiple channels that one could select from and the system can proactively move devices between different channels of the spectrum to avoid conflict.

In one embodiment, wireless access points and/or end user devices equipped with the required hardware (e.g., satellite chips) can communicate directly with a satellite. In one embodiment, wireless access points and/or end user devices that are not equipped with the required hardware (e.g., satellite chips) can communicate with one or more other wireless access points or other end user devices that are directly communicating with the satellite, which can be providing routing instructions such as do not connect to the CBRS wireless access point because it is predicted that a truck will be parking in front of it over the next ten minutes so instead utilize a different wireless access point.

In one embodiment, the SOA is located at the core, at the edge, in the O-RAN, at the cellular tower, or at other locations. In one embodiment, the core network can obtain precise locations of access point in a number of different ways such as GPS data received directly from the wireless access point, or from other wireless access points that know or calculate the position of the wireless access point. In one embodiment, the satellite control plane model can be handled in a centralized fashion where a central controller generates the routing instructions based on images captured by the satellite. In one embodiment, the satellite control plane model can be handled in a distributed fashion where multiple controllers generate routing instructions (e.g., peer-to-peer) based on images captured by the satellite. In one embodiment, routing instructions can be handled in a centralized model or a distributed model such as peer-to-peer, and then can be switched to the satellite control plane model described herein.

In one embodiment, routing instructions can be generated at equipment of the cellular tower. In one embodiment, routing instructions can be handled in a peer-to-peer fashion but each or some of the peers can be provided with recommendations or information from the satellite to facilitate selection of the next hop.

In one embodiment, routing instructions can be recommendation to the wireless access point or other routing controller such as indicating that a particular recipient wireless access point may currently have a stronger signal, but in the next two minutes that signal will decrease (e.g., by application of AI/ML to predict future interference or conditions). In one embodiment, routing instructions can be generated by the satellite which are commands that are followed by the wireless access point.

In one embodiment, the satellites can function to capture images and provide a pathway for routing instructions, where the analysis of the images (or other information) and the generating of the routing instructions are handled by a terrestrial device.

In one embodiment, the historical analysis to predict interference can include identifying objects travelling into the area (e.g., a garbage truck) and accessing past performance information when similar objects moved into the area. In one embodiment, the predictions can be based on speeds of objects such as determining that trucks moving under 5 MPH will create interference whereas trucks moving over 45 MPH will not create significant interference (or other criteria, speed, etc.). In one embodiment, the predictions can be based on directions of movement of objects, including the particular lane that a vehicle is travelling in.

In one embodiment, a satellite moving out of a coverage area can export all of its experiences, profiles, activities and so forth that took place in this geographical area to the next successor satellite. In one embodiment, multiple satellites operate as a mesh or one intelligent back control system. In one embodiment, the satellites can communicate directly with each other and/or can communicate with terrestrial equipment which can be performing coordination operations.

In one embodiment, the wireless access points can be part of a private cellular network that operates on CBRS or another spectrum. In one embodiment, the satellite control plane or portions thereof can be implemented all the time or could be triggered when a wireless access point (or an area) requires some assistance. For example, an end user device may be trying to initiate a TLS protocol or trying to send money to a bank. In one embodiment, the wireless access point can be intelligent enough to request the most secure network and the satellite control place can facilitate that request.

In one embodiment, the satellites can communicate with threat intelligence centers which identify particular areas, such as a zip code, and can be informed that there are attacks (e.g., DoS attacks) originating from this zip code, so the satellite can route traffic outside this hot zone.

Figure 2B:
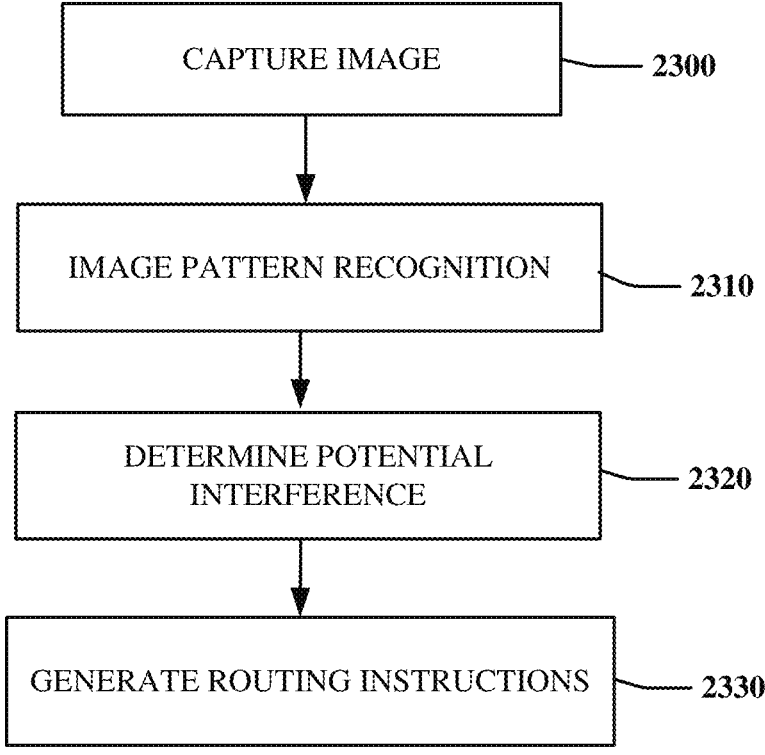
FIG. 2B depicts an illustrative embodiment of a method in accordance with various aspects described herein.

FIG. 2B depicts an illustrative embodiment of a method 230 in accordance with various aspects described herein. Method 230 can be performed by a single device or by a group of devices in a central or distribute fashion, including satellites, network servers, network core equipment, edge servers, and so forth.

At 2300, one or more images can be captured by one or more satellites. In one or more embodiments, the satellites can operate as a mesh for implementing a satellite control plane for multiple wireless access points. At 2310, image pattern recognition or other analysis can be applied to the one or more images. In one embodiment, the analysis can include applying AI/ML to the one or more images, which can include applying or otherwise analyzing other information as well such as network conditions, to make determinations that can be current estimations/determinations and/ or future predictions. This analysis can be performed by the satellite or can be performed by a terrestrial device which has been provided to the one or more images. In one embodiment, different satellites can have different capabilities, and images from one satellite can be provided to a second or more satellites for performing the analysis.

At 2320, the analysis can include determining potential interference with respect to the wireless access points. As an example, the images could reveal that a large truck is parked in front of the wireless access point. As another example, the images and the AI/ML could reveal that a truck is moving towards a wireless access point and that it is predicted that interference will be created which lowers signal strength below a particular threshold and further predict that this event will last for 25 minutes because the truck is predicted to unload in front of the location of the wireless access point. Various types of events can be determined and predictions can be made, including a large number of people exiting a venue which will create interference and/or create a strain on local wireless resources. This analysis can be performed by the satellite or can be performed by a terrestrial device which has been provided with the one or more images. In one embodiment, different satellites can have different capabilities, and images from one satellite can be provided to a second or more satellites for performing the analysis.

At 2330, routing instructions can be generated according to determining potential interference and/or the analysis at 2310 and 2320 for one or more recipient wireless access points. This generating of the routing instructions can be performed by the satellite and/or can be performed by a terrestrial device which has been provided with the one or more images. In one embodiment, different satellites can have different capabilities, and images from one satellite can be provided to a second or more satellites for performing the routing generation.

In one or more embodiments, the routing instructions can be provided (e.g., from a satellite and/or from a terrestrial device) to source wireless access point(s) and/or end user device(s) for transmitting wireless communications according to the routing instructions thereby avoiding the potential signal interference and/or improving traffic conditions or creating efficiencies in the network. In one or more embodiments, an API can be established with one or more source wireless access points and/or one or more recipient wireless access points, where the API facilitates providing queries from the satellite.

In one or more embodiments, location data can be obtained for one or more recipient wireless access points from equipment of a wireless core network, where the wireless core network is operated by a first entity that is different from a second entity operating at least one of the one or more recipient wireless access points, and where the routing instructions cause the wireless communications to route to a particular recipient wireless access point that operates on a Citizens Broadband Radio Service (CBRS) spectrum.

While for purposes of simplicity of explanation, the respective processes are shown and described as a series of blocks in FIG. 2B, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 3:
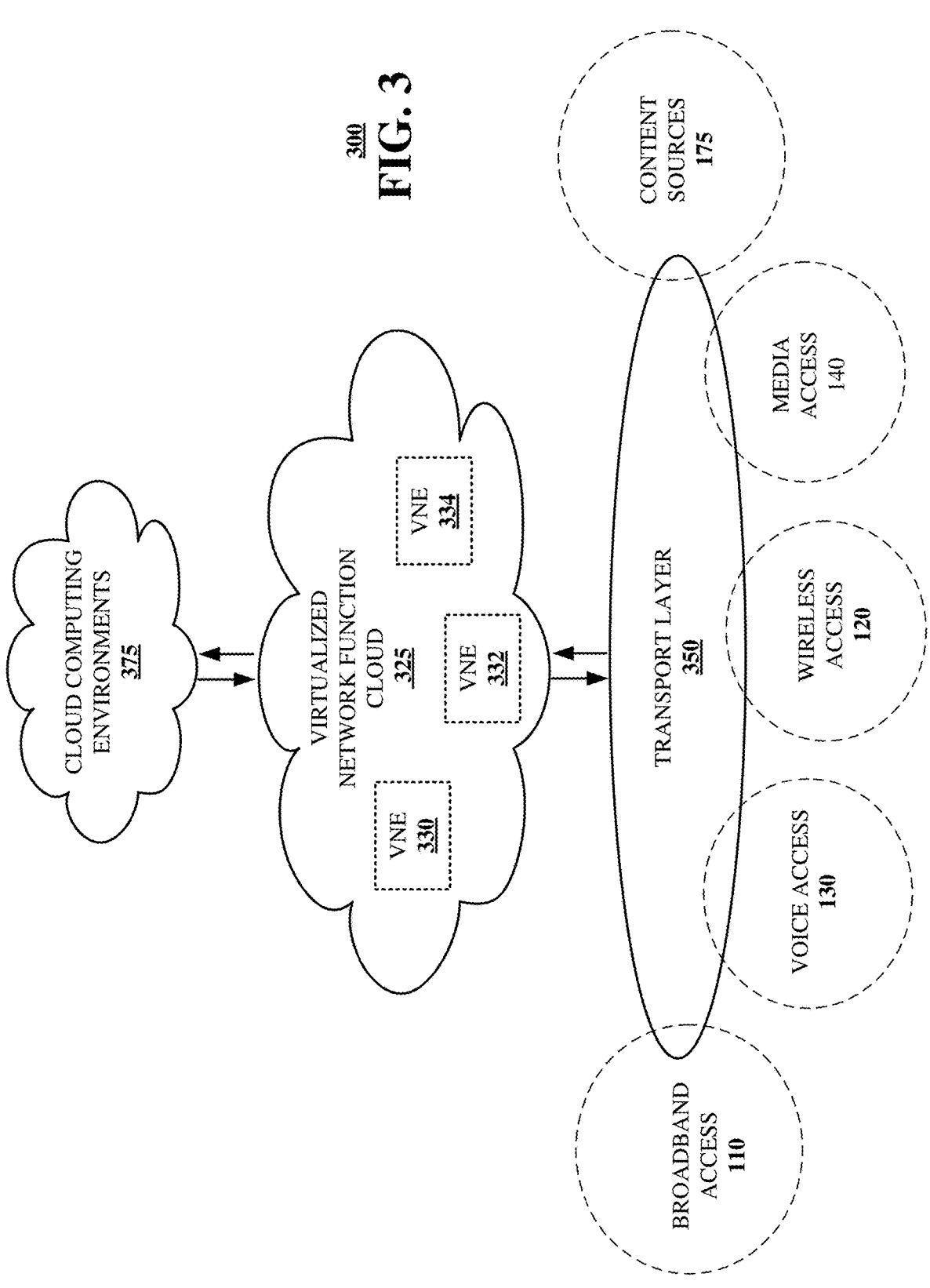
FIG. 3 is a block diagram illustrating an example, non-limiting embodiment of a virtualized communication network in accordance with various aspects described herein.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of system 100, the subsystems and functions of system 200, and method 230 presented in FIGS. 1, 2A, 2B, and 3. For example, virtualized communication network 300 can facilitate in whole or in part obtaining an image of a location that includes a wireless access point; analyzing the image to determine a potential signal interference from an object that has moved into a position with respect to the wireless access point; and generating routing instructions for wireless communications according to the potential signal interference.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
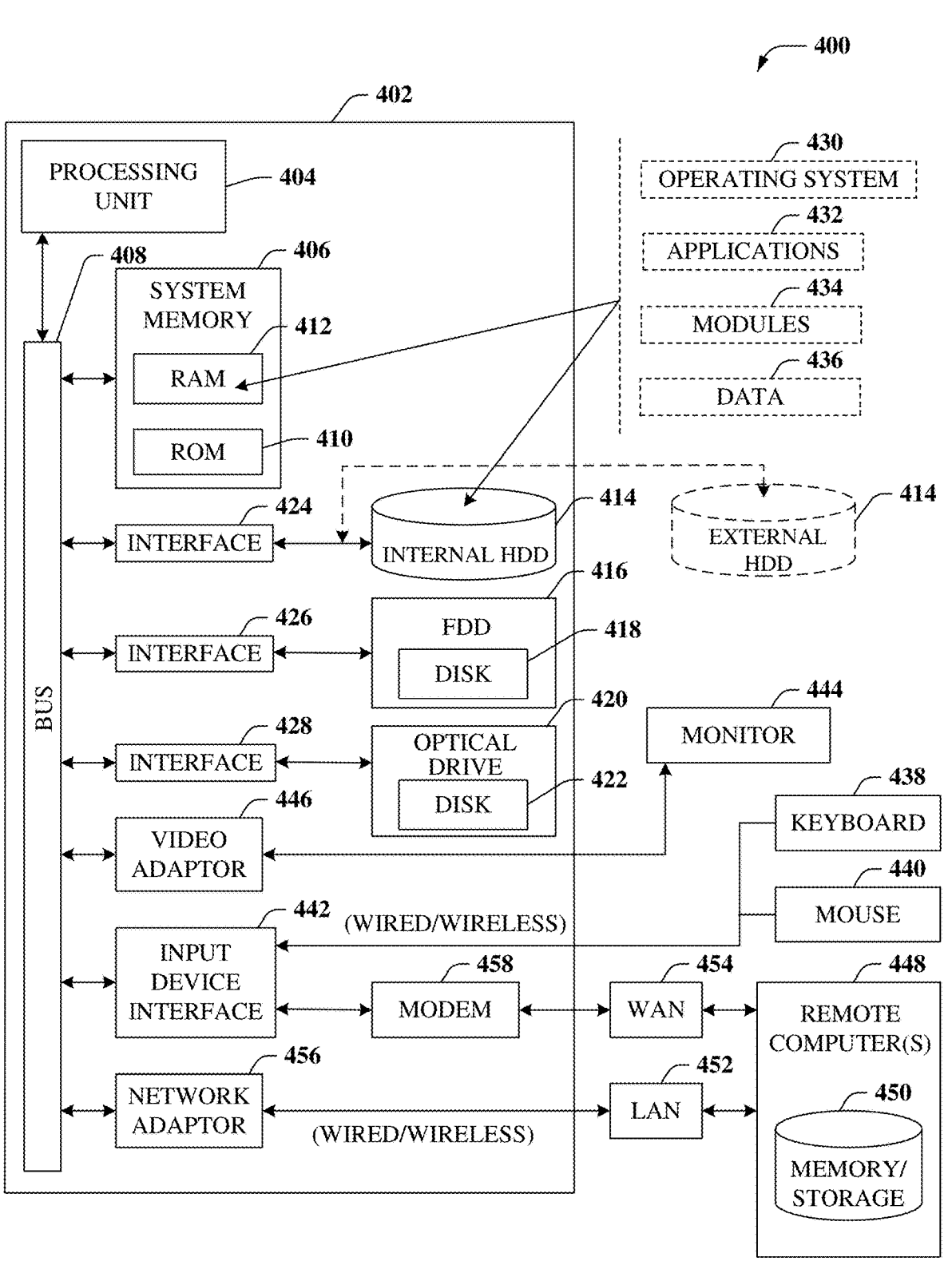
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part obtaining an image of a location that includes a wireless access point; analyzing the image to determine a potential signal interference from an object that has moved into a position with respect to the wireless access point; and generating routing instructions for wireless communications according to the potential signal interference.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
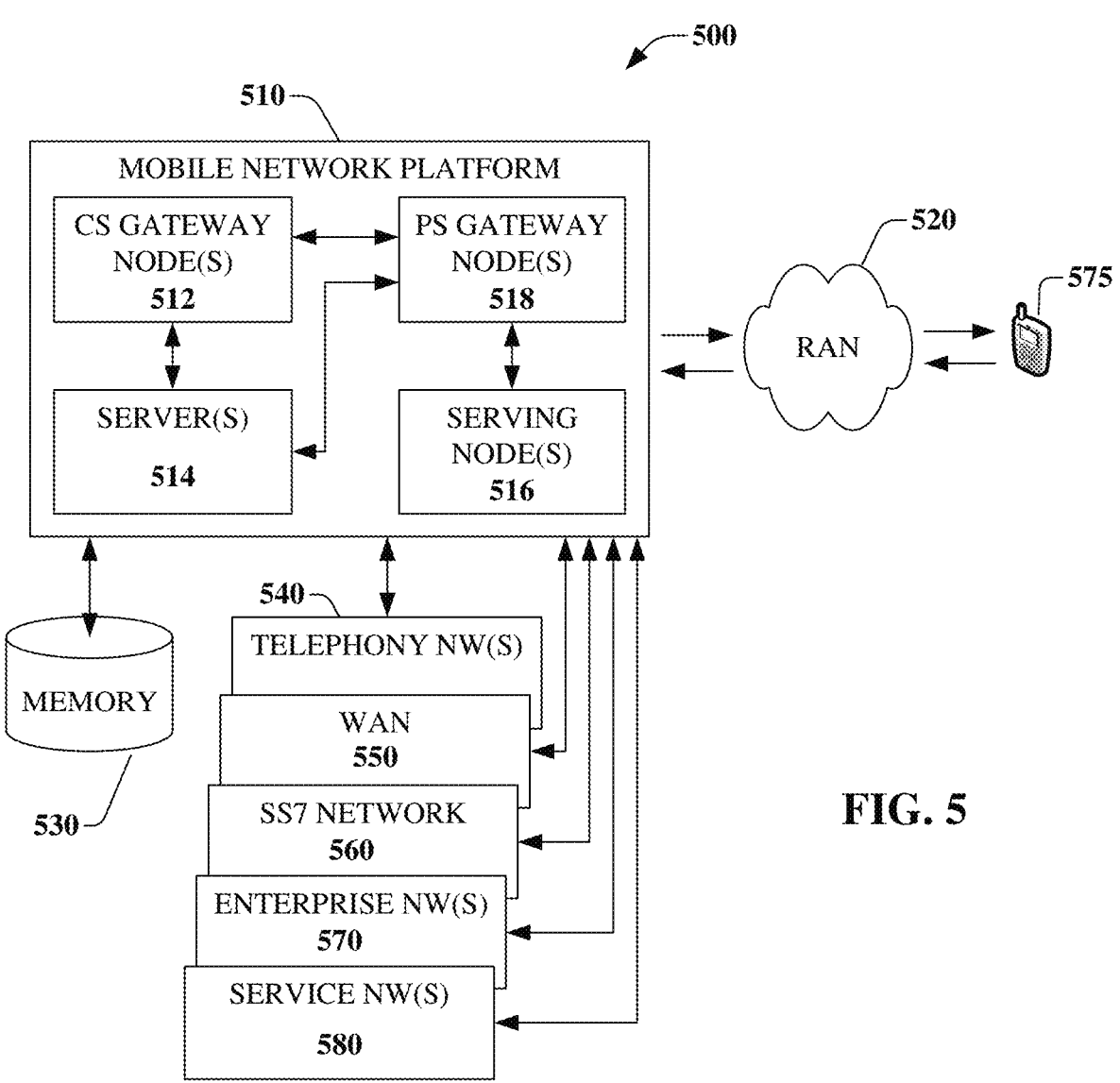
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part obtaining an image of a location that includes a wireless access point; analyzing the image to determine a potential signal interference from an object that has moved into a position with respect to the wireless access point; and generating routing instructions for wireless communications according to the potential signal interference. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology (ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(*s*) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
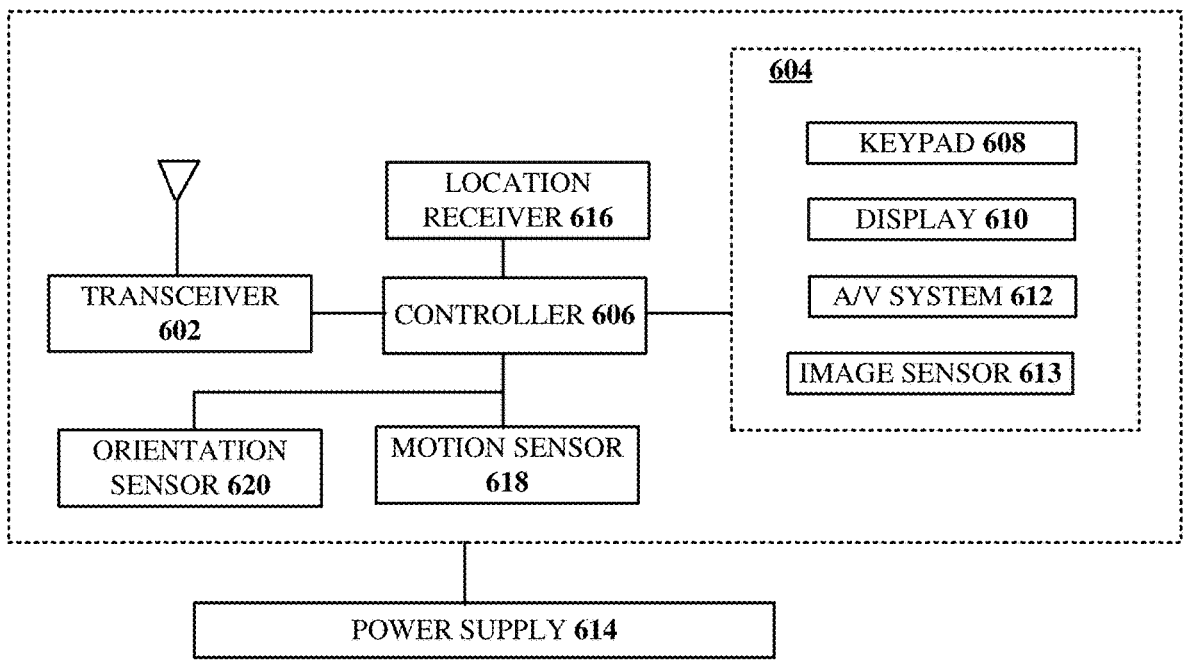
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part obtaining an image of a location that includes a wireless access point; analyzing the image to determine a potential signal interference from an object that has moved into a position with respect to the wireless access point; and generating routing instructions for wireless communications according to the potential signal interference.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SL-DRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x1, x2, x3, x4, \ldots, xn)$, to a confidence that the input belongs to a class, that is, $f(x)$ =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A non-transitory machine-readable medium, comprising executable instructions that, when executed by a processing system including a processor of a satellite, facilitate performance of operations, the operations comprising:

obtaining an image of a location that includes a wireless access point;

analyzing the image to determine a potential signal interference from an object that has moved into a position with respect to the wireless access point;

generating routing instructions for wireless communications according to the potential signal interference; and providing the routing instructions to a source wireless access point, wherein the source wireless access point rejects the routing instructions and transmits the wireless communications to the wireless access point.

2. The non-transitory machine-readable medium of claim 1, wherein the operations further comprise providing the routing instructions to a source wireless access point that enables the source wireless access point to transmit the wireless communications to a recipient wireless access point so as to avoid routing to the wireless access point.

3. The non-transitory machine-readable medium of claim 2, wherein the operations further comprise selecting the recipient wireless access point from among a group of wireless access points based in part on load balancing.

4. The non-transitory machine-readable medium of claim 2, wherein the operations further comprise:

selecting a second recipient wireless access point based on avoiding routing to the wireless access point and based on avoiding routing to the recipient wireless access point;

generating second routing instructions for second wireless communications associated with an end user device according to the selecting of the second recipient wireless access point; and providing the second routing instructions to one of the source wireless access point or the end user device.

5. The non-transitory machine-readable medium of claim 1, wherein the operations further comprise providing the routing instructions to an end user device that enables the end user device to transmit the wireless communications to a recipient wireless access point so as to avoid routing to the wireless access point.

6. The non-transitory machine-readable medium of claim 5, wherein the operations further comprise selecting the recipient wireless access point from among a group of wireless access points based in part on load balancing.

7. The non-transitory machine-readable medium of claim 1, wherein the operations further comprise:

obtaining a second image of the location that includes the wireless access point;

analyzing the second image to determine that the potential signal interference no longer exists; and

generating second routing instructions for second wireless communications according to the potential signal interference no longer existing.

8. The non-transitory machine-readable medium of claim 7, wherein the operations further comprise providing the second routing instructions to a source wireless access point that enables the source wireless access point to transmit the second wireless communications to the wireless access point.

9. The non-transitory machine-readable medium of claim 7, wherein the operations further comprise providing the second routing instructions to an end user device that enables the end user device to transmit the second wireless communications to the wireless access point.

10. The non-transitory machine-readable medium of claim 1, wherein the object is one of a vehicle or a group of people.

11. The non-transitory machine-readable medium of claim 10, wherein the analyzing the image to determine the potential signal interference from the object comprises machine learning utilizing a model that is trained on objects that include at least one of the vehicle or the group of people, wherein the model generates a prediction that quantifies the potential signal interference.

12. A wireless access point, comprising:
a processing system including a processor; and
a memory that stores executable instructions that, when executed by the processing system, facilitate performance of operations, the operations comprising:
receiving routing instructions that are generated according to analyzing of an image captured by a satellite to determine a potential signal interference for one or more recipient wireless access points,
wherein the routing instructions are received from one of the satellite or a terrestrial network element executing a satellite operation application that has access to a topology profile comprising locations of a plurality of wireless access points that includes the wireless access point and the one or more recipient wireless access points, wherein the topology profile is periodically updated by equipment of a wireless core network; and
transmitting wireless communications according to the routing instructions thereby avoiding the potential signal interference.

13. The wireless access point of claim 12, wherein the routing instructions are received from one of the satellite, a terrestrial network element, or an end user device sourcing the wireless communications.

14. The wireless access point of claim 12, wherein the potential signal interference is one of a vehicle or a group of people that appears in the image.

15. The wireless access point of claim 14, wherein the analyzing of the image comprises machine learning utilizing a model that is trained on objects that include at least one of the vehicle or the group of people, wherein the model generates a prediction as to an effect of the potential signal interference on the wireless communications.

16. A method, comprising:
capturing, by a processing system including a processor of a satellite, an image;
obtaining, by the processing system, routing instructions that are generated according to analyzing of the image captured by the satellite to determine a potential signal interference for one or more recipient wireless access points;
providing, by the processing system, the routing instructions to one of a source wireless access point or an end user device for transmitting wireless communications according to the routing instructions thereby avoiding the potential signal interference; and
establishing, by the processing system, an application programming interface (API) with one or more of the source wireless access point and the one or more recipient wireless access points, wherein the API facilitates providing queries from the satellite.

17. The method of claim 16, further comprising:
receiving, by the processing system, location data for the one or more recipient wireless access points from equipment of a wireless core network, wherein the wireless core network is operated by a first entity that is different from a second entity operating at least one of the one or more recipient wireless access points, and wherein the routing instructions cause the wireless communications to route to a particular recipient wireless access point that operates on a Citizens Broadband Radio Service (CBRS) spectrum.

* * * * *